United States Patent
Kameda

(10) Patent No.: US 9,446,631 B2
(45) Date of Patent: Sep. 20, 2016

(54) RUBBER COMPOSITION FOR RUN-FLAT TIRE

(71) Applicant: THE YOKOHAMA RUBBER CO., LTD., Tokyo (JP)

(72) Inventor: Yoshihiro Kameda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/440,046

(22) PCT Filed: Oct. 25, 2013

(86) PCT No.: PCT/JP2013/078952
§ 371 (c)(1),
(2) Date: Apr. 30, 2015

(87) PCT Pub. No.: WO2014/069358
PCT Pub. Date: May 8, 2014

(65) Prior Publication Data
US 2015/0298511 A1    Oct. 22, 2015

(30) Foreign Application Priority Data
Oct. 30, 2012 (JP) .................... 2012-239194

(51) Int. Cl.
| | | |
|---|---|---|
| *B60C 17/00* | (2006.01) | |
| *B60C 5/00* | (2006.01) | |
| *C08L 9/00* | (2006.01) | |
| *B60C 1/00* | (2006.01) | |

(52) U.S. Cl.
CPC ............ *B60C 17/0009* (2013.04); *B60C 1/00* (2013.01); *B60C 5/00* (2013.01); *B60C 17/00* (2013.01); *C08L 9/00* (2013.01); *B60C 2001/0033* (2013.04); *B60C 2017/0054* (2013.04); *C08K 2201/006* (2013.01)

(58) Field of Classification Search
CPC ............... B60C 17/0009; B60C 5/00; B60C 2001/0033; C08L 9/00
USPC .......................................................... 524/515
See application file for complete search history.

(56) References Cited

U.S. PATENT DOCUMENTS

| | | | |
|---|---|---|---|
| 2004/0092647 A1 | 5/2004 | Chauvin | |
| 2005/0209393 A1* | 9/2005 | Hochi ................. | C08K 3/04 524/496 |

FOREIGN PATENT DOCUMENTS

| | | |
|---|---|---|
| JP | H06-172587 | 6/1994 |
| JP | 2000-080302 | 3/2000 |
| JP | 2004-519552 | 7/2004 |
| JP | 2004-268714 | 9/2004 |
| JP | 2005-263893 | 9/2005 |
| JP | 2007-031523 | 2/2007 |
| JP | 2010-132872 | 6/2010 |
| JP | 2012-207185 | 10/2012 |
| JP | 2012207185 A * | 10/2012 ............... B60C 1/00 |
| JP | 2012-251021 | 12/2012 |
| JP | 2013-227424 | 11/2013 |
| WO | WO 02092680 | 11/2002 |

OTHER PUBLICATIONS

JP2012-207185A—Kameda—machine translation—original published in Japanese—Oct. 25, 2012.*
International Search Report for International Application No. PCT/JP2013/078952 dated Dec. 24, 2013, 4 pages, Japan.

* cited by examiner

*Primary Examiner* — Ling Choi
*Assistant Examiner* — Ronald Grinsted
(74) *Attorney, Agent, or Firm* — Thorpe North & Western

(57) ABSTRACT

A rubber composition for a run-flat tire comprises from 20 to 100 parts by weight of a reinforcing filler per 100 parts by weight of a diene rubber containing from 10 to 80 wt. % of butadiene rubber and from 10 to 40 wt. % of natural rubber; wherein the reinforcing filler contains at least 50 wt. % of carbon black; a mode diameter Dst in a mass distribution curve of a Stokes diameter of aggregates of the carbon black is at least 145 nm; a nitrogen adsorption specific surface area $N_2SA$ is from 45 to 70 m$^2$/g; and a ratio $N_2SA/IA$ of the nitrogen adsorption specific surface area $N_2SA$ to an iodine adsorption IA (units: mg/g) is from 1.00 to 1.40.

7 Claims, 1 Drawing Sheet

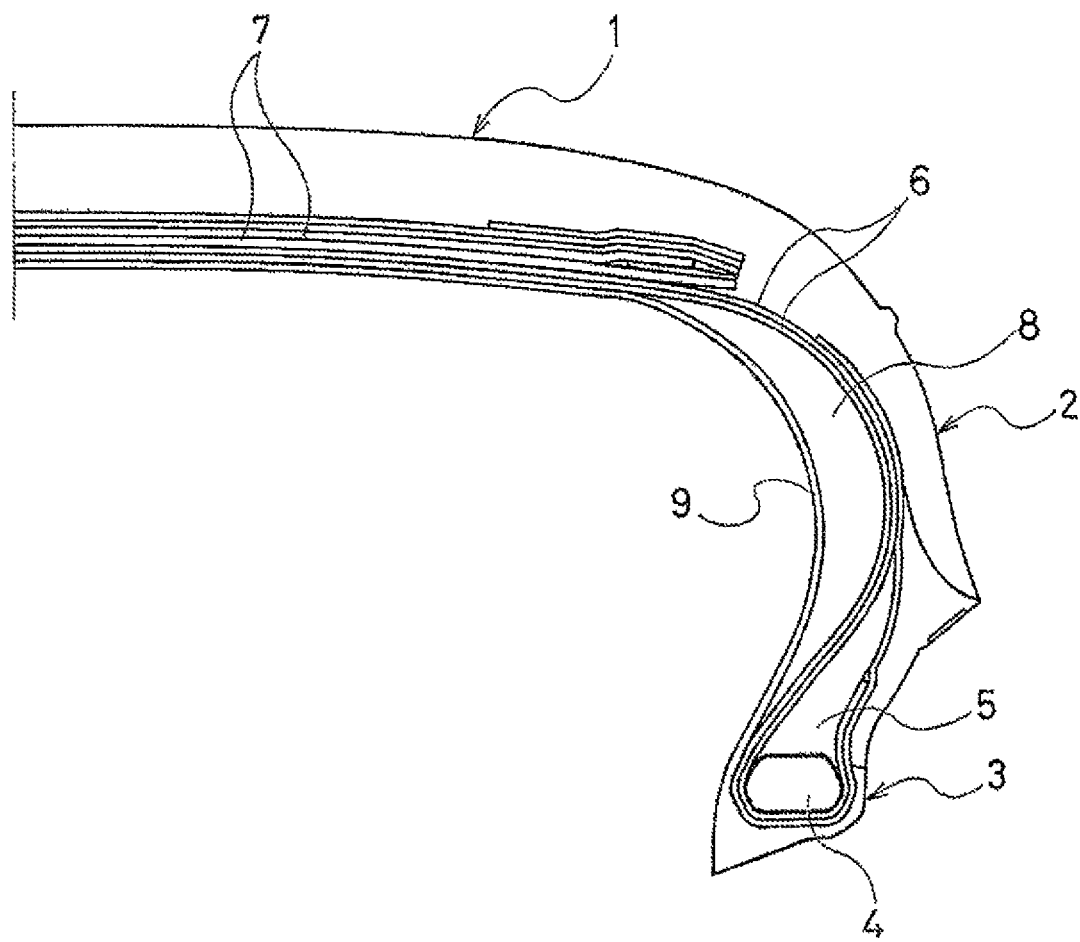

RUBBER COMPOSITION FOR RUN-FLAT TIRE

TECHNICAL FIELD

The present technology relates to a rubber composition for a run-flat tire which improves the ride comfort and steering stability during normal travel over the conventional level while reducing rolling resistance when a tire is produced by adding carbon black having controlled colloidal properties.

BACKGROUND

Conventionally, as a pneumatic tire having run-flat traveling performance, a side rubber reinforcement layer formed of a hard rubber with a crescent-shaped cross section is provided on a side wall portion, and a certain traveling distance is ensured based on the rigidity of this side rubber reinforcement layer, even if the air pressure drops in the event of a puncture. This side rubber reinforcement layer secures a high level of rigidity by suppressing heat build-up at the time of run-flat traveling, so the layer is required to have low heat build-up and high rigidity.

As concern over global environmental issues increases, there is an increased demand for the improvement of fuel consumption performance during normal travel. In order to improve fuel consumption performance, it is necessary to suppress heat build-up at the time of traveling and to reduce the rolling resistance of tires. Therefore, heat build-up in the rubber composition constituting pneumatic tires has been suppressed, and the rolling resistance when a tire is produced has been made smaller. As an indicator of the heat build-up in a rubber composition, tan $\delta$ at 60° C. determined by dynamic visco-elasticity measurement is typically used, and smaller tan $\delta$ (60° C.) of the rubber composition indicates smaller heat build-up.

As a method of reducing the tan $\delta$ (60° C.) of a rubber composition, Japanese Unexamined Patent Application Publication No. 2010-132872A proposes adding silica and a silane coupling agent to a rubber component containing modified butadiene. However, in recent years there is a strong demand to further reduce the rolling resistance and to achieve a high level balance between low rolling resistance and ride comfort and steering stability during normal travel, and there is a demand to improve the performance described above from the perspective of not only a silica-containing system, but also carbon black.

Examples of methods of reducing the tan $\delta$ (60° C.) of a rubber composition with carbon black include reducing the compounding ratio of carbon black, increasing the specific surface area of carbon black, and reducing the size of aggregates. However, such methods are problematic in that the mechanical characteristics such as tensile break strength and the rubber hardness are diminished and that the ride comfort and/or steering stability is diminished when a tire is produced.

Therefore, Japanese Unexamined Patent Application Publication No. 2004-519552A proposes reducing heat build-up in a rubber composition primarily by adding carbon black having an adjusted specific surface area (BET (Brunauer-Emmett-Teller) specific surface area, CTAB (cetyltrimethyl ammonium bromide) specific surface area, and iodine adsorption index (IA)), DBP (dibutyl phthalate) structure value, Stokes diameter (Dst), and the like. However, in the case of this rubber composition, the effect of combining both low heat build-up in the rubber composition and ride comfort and steering stability during normal travel is not necessarily sufficient, and there has been a demand for further improvements.

SUMMARY

The present technology provides a rubber composition for a run-flat tire which improves the ride comfort and steering stability during normal travel over the conventional level while reducing rolling resistance when a tire is produced by adding carbon black having controlled colloidal properties.

A rubber composition for a run-flat tire according to the present technology is a rubber composition for a tire, the rubber composition including from 20 to 100 parts by weight (pbw) of a reinforcing filler per 100 parts by weight of a diene rubber containing from 10 to 80 wt. % butadiene rubber and from 10 to 40 wt. % natural rubber, wherein the reinforcing filler contains at least 50 wt. % of carbon black; the mode diameter Dst in the mass distribution curve of the Stokes diameter of aggregates of the carbon black is at least 145 nm; the nitrogen adsorption specific surface area $N_2SA$ is from 45 to 70 m$^2$/g; and the ratio $N_2SA/IA$ of the nitrogen adsorption specific surface area $N_2SA$ to the iodine adsorption IA (units: mg/g) is from 1.00 to 1.40.

The rubber composition for a tire according to the present technology is prepared by adding from 20 to 100 parts by weight of a reinforcing filler containing at least 50 wt. % carbon black per 100 parts by weight of a diene rubber containing from 10 to 80 wt. % butadiene rubber and from 10 to 40 wt. % natural rubber, wherein the mode diameter Dst in the mass distribution curve of the Stokes diameter of aggregates of the carbon black is at least 145 nm; the nitrogen adsorption specific surface area $N_2SA$ is from 45 to 70 m$^2$/g; and the ratio $N_2SA/IA$ of the nitrogen adsorption specific surface area $N_2SA$ to the iodine adsorption IA (units: mg/g) is from 1.00 to 1.40. Therefore, it is possible to reduce the tan $\delta$ (60° C.) of the rubber composition and improve the ride comfort and steering stability during normal travel over the conventional level while reducing rolling resistance when a tire is produced.

The DBP absorption of carbon black is preferably from 100 to 160 ml/100 g.

As an upper limit of the mode diameter Dst of the Stokes diameter of the carbon black, Dst is preferably at most 180 nm when $N_2SA$ is at most 55 m$^2$/g, and Dst preferably satisfies the relationship of the following formula (1) when $N_2SA$ exceeds 55 m$^2$/g.

$$Dst < 1979 \times (N_2SA)^{-0.61} \tag{1}$$

(In the formula, Dst is the mode diameter (nm) in the mass distribution curve of the Stokes diameter of aggregates, and $N_2SA$ is the nitrogen adsorption specific surface area (m$^2$/g))

As the butadiene rubber described above, 10 to 40 wt. % of a butadiene rubber containing a syndiotactic-1,2-polybutadiene component is preferably contained in the aforementioned diene rubber, and this makes it possible to further enhance the reinforcing property of the rubber composition.

A run-flat tire produced by adding a rubber reinforcement layer with a crescent-shaped cross section to left and right side wall portions of a pneumatic tire with the rubber composition for a run-flat tire according to the present technology can improve the ride comfort and steering stability during normal travel over the conventional level while improving the fuel consumption performance by reducing rolling resistance during normal travel. In addition, the run-flat traveling performance is excellent at the time of run-flat traveling, and heat build-up in the side rubber reinforcement layer with a crescent-shaped cross section of the side wall portions is suppressed, so the durability performance is also excellent.

BRIEF DESCRIPTION OF THE DRAWING

FIG. 1 is a cross-sectional view in a tire meridian direction illustrating an embodiment of a run-flat tire using the rubber composition for a run-flat tire according to the present technology.

DETAILED DESCRIPTION

An example of a tire to which the rubber composition for a run-flat tire according to the present technology is applied is a side reinforcement type run-flat tire including a rubber reinforcement layer with a crescent-shaped cross section added to left and right side wall portions. FIG. 1 is a half cross-sectional view in a tire meridian direction illustrating an example of a side reinforcement type run-flat tire.

In FIG. 1, the run-flat tire has a tread part 1, a side wall portion 2, a bead part 3, and two plies of carcasses 6 are provided so as to be folded back from the inside to the outside while enclosing a bead core 4 and a bead filler 5 between a pair of left and right bead cores 4 and 4. A belt layer 7 including a plurality of plies (two plies in the drawing) is disposed on the outer peripheral side of the carcass 6 of the tread part over the perimeter of the tire so as to form a radial structure. An inner liner layer 9 is disposed on the innermost peripheral side of the tire. In addition, rubber reinforcement layers 8 and 8 with crescent-shaped cross sections are respectively inserted into the carcasses 6 in left and right side wall portions 2 and 2. The position at which each side rubber reinforcement layer is inserted is not limited to the illustrated example, and the layer may be also inserted between the two carcasses 6.

The rubber composition for a run-flat tire according to the present technology can be suitably used for the rubber reinforcement layer 8 with a crescent-shaped cross section.

In the rubber composition for a run-flat tire according to the present technology, the diene rubber must contain a natural rubber and a butadiene rubber. By containing a natural rubber, the tensile break strength and the tensile elongation at break increase due to the high molecular weight thereof. In addition, by containing a butadiene rubber, the temperature dependency of the hardness decreases due to the low brittle temperature, which yields excellent durability performance.

The content of the natural rubber is from 10 to 40 wt. % and preferably from 20 to 40 wt. % out of 100 wt. % of the diene rubber. When the content of the natural rubber is less than 10 wt. %, the tensile break strength becomes low, which makes the composition unsuitable for a rubber reinforcement layer with a crescent-shaped cross section of the run-flat tire. When the content of the natural rubber exceeds 40 wt. %, the tensile break strength and the tensile elongation at break are sufficient, and the composition yields a rubber reinforcement layer of high strength with a crescent-shaped cross section, but the repeated fatigability becomes insufficient, which leads to poor durability.

In addition, the content of the butadiene rubber is from 10 to 80 wt. % and preferably from 20 to 80 wt. % out of 100 wt. % of the diene rubber. When the content of the butadiene rubber is less than 10 wt. %, the repeated fatigability is diminished. When the content of the butadiene rubber exceeds 80 wt. %, the rubber strength of the rubber composition decreases excessively.

A preferable butadiene rubber is one partially containing a syndiotactic-1,2-polybutadiene component. The syndiotactic-1,2-polybutadiene component is a resin with high crystallinity and is finely dispersed in the butadiene rubber. By adding a butadiene rubber containing this syndiotactic-1,2-polybutadiene component, the hardness and tensile stress of the rubber composition increase, which makes it possible to improve the amount of rubber deformation to the optimum amount.

The content of the butadiene rubber containing a syndiotactic-1,2-polybutadiene component is preferably from 10 to 40 wt. % out of 100 wt. % of the diene rubber. When the content of the butadiene rubber containing a syndiotactic-1,2-polybutadiene component is less than 10 wt. %, the reinforcing property of the rubber composition cannot be sufficiently achieved. In addition, when the content of the butadiene rubber exceeds 40 wt. %, the rolling resistance is diminished.

The content of the syndiotactic-1,2-polybutadiene component in the butadiene rubber containing a syndiotactic-1,2-polybutadiene component suitably used in the present technology is preferably from 1 to 50 wt. % and more preferably from 3 to 25 wt. %. When the content of the syndiotactic-1,2-polybutadiene component is less than 1 wt. %, it may not be possible to sufficiently improve reinforcing performance. In addition, when the content of the syndiotactic-1,2-polybutadiene component exceeds 50 wt. %, the rubber composition becomes too hard, and the tensile elongation at break decreases, which is not preferable.

A commercially available product may be used as such a butadiene rubber containing a syndiotactic-1,2-polybutadiene, and examples include UBEPOL VCR412, VCR617, VCR450, VCR800, and the like made by Ube Industries, Ltd.

In the present technology, the diene rubber may be constituted by a butadiene rubber and a natural rubber. In addition, the composition may also contain another diene rubber other than a butadiene rubber and a natural rubber as a diene rubber. Examples of other diene rubbers include isoprene rubber, styrene-butadiene rubber, acrylonitrile-butadiene rubber, and the like. Of these, isoprene rubber and styrene-butadiene rubber are preferable. These diene rubbers may be used alone or as a desirable blend thereof.

In the rubber composition for a run-flat tire according to the present technology, a reinforcing filler is added in an amount of from 20 to 100 parts by weight and preferably from 30 to 90 parts by weight per 100 parts by weight of the diene rubber. When the compounding ratio of the reinforcing filler is less than 20 parts by weight, the reinforcing property of the rubber composition is not sufficiently achieved. In addition, when the compounding ratio of the reinforcing filler exceeds 100 parts by weight, the rolling resistance when a tire is produced becomes large.

Examples of reinforcing fillers include carbon black, silica, clay, mica, talc, calcium carbonate, aluminum oxide, titanium oxide, and active zinc oxide. Of these, carbon black, silica, and clay are preferable.

In the present technology, the specific carbon black described below must be included as a reinforcing filler. That is, in the rubber composition for a tire according to the present technology, a specific novel carbon black must be added, wherein the mode diameter Dst in the mass distribution curve of the Stokes diameter of aggregates, the DBP absorption, the nitrogen adsorption specific surface area $N_2SA$, and the ratio $N_2SA/IA$ of the nitrogen adsorption specific surface area to the iodine adsorption IA are limited. This makes it possible to maintain and improve the ride comfort and steering stability when a tire is produced while reducing the tan δ (60° C.) of the rubber composition using carbon black with a large particle size. The compounding ratio of the carbon black is at least 50 wt. % out of 100 wt. % of the reinforcing filler and is preferably from 50 to 100 wt. % out of 100 wt. % of the reinforcing filler. When the compounding ratio of the carbon black is less than 50 wt. %, the desired effects cannot be achieved.

The carbon black used in the present technology has a nitrogen adsorption specific surface area $N_2SA$ of from 45 to 70 $m^2/g$ and preferably from 48 to 62 $m^2/g$. When the adsorption specific surface area $N_2SA$ is less than 45 $m^2/g$, the steering stability when a tire is produced is reduced. When the nitrogen adsorption specific surface area $N_2SA$ exceeds 70 $m^2/g$, tan δ (60° C.) becomes large. The nitrogen adsorption specific surface area $N_2SA$ is measured in accordance with JIS (Japanese Industrial Standard) K6217-2.

In addition, the ratio $N_2SA/IA$ of the nitrogen adsorption specific surface area $N_2SA$ to the iodine adsorption IA (units: mg/g) of the carbon black is set to 1.00 to 1.40 and preferably from 1.01 to 1.27. When the ratio $N_2SA/IA$ of this colloidal property is less than 1.00, the tan δ (60° C.) of the rubber composition cannot be made small. In addition, when the ratio $N_2SA/IA$ exceeds 1.40, the surface activity becomes too high, and the mixability is diminished. The iodine adsorption IA is measured in accordance with JIS K6217-1.

Further, the DBP absorption of the carbon black is preferably set to 100 to 160 ml/100 g and more preferably from 110 to 150 ml/100 g. When the DBP absorption is less than 100 ml/100 g, the reinforcing performance of the rubber composition is diminished, and the steering stability and ride comfort are thus diminished. In addition, the molding processability of the rubber composition decreases, and the dispersibility of the carbon black diminishes, so the reinforcing performance of the carbon black cannot be sufficiently achieved. When the DBP absorption exceeds 160 ml/100 g, the steering stability is diminished. Furthermore, processability deteriorates due to increase in viscosity. The DBP absorption number is measured in accordance with JIS K6217-4, Oil Absorption Number Method A.

In the carbon black used in the present technology, the mode diameter Dst in the mass distribution curve of the Stokes diameter of aggregates (also called the "Stokes diameter Dst" hereafter) is at least 145 nm and preferably at least 150 nm. By setting the Stokes diameter Dst to at least 145 nm, it is possible to maintain and improve the steering stability and ride comfort while reducing the tan δ (60° C.) of the rubber composition. In the present technology, the mode diameter Dst in the mass distribution curve of the Stokes diameter of aggregates refers to the most frequent mode diameter in the mass distribution curve of the Stokes diameter of aggregates obtained optically by subjecting the carbon black to centrifugation. In the present technology, Dst is measured in accordance with the determination of aggregate size distribution by disc centrifuge photosedimentometry of JIS K6217-6.

In addition, the upper limit of the Stokes diameter Dst is not particularly limited but can be determined based on a relationship with the nitrogen adsorption specific surface area $N_2SA$ of the carbon black. That is, when the $N_2SA$ of the carbon black is at least 45 $m^2/g$ and at most 55 $m^2/g$, the Stokes diameter Dst is preferably at most 180 nm. In addition, when the $N_2SA$ of the carbon black is greater than 55 $m^2/g$ and at most 70 $m^2/g$, the Stokes diameter Dst preferably satisfies the relationship of the following formula (1).

$$Dst<1979\times(N_2SA)^{-0.61} \quad (1)$$

(In the formula (1), Dst is the mode diameter (nm) in the mass distribution curve of the Stokes diameter of aggregates, and $N_2SA$ is the nitrogen adsorption specific surface area $(m^2/g)$)

By setting the upper limit of the Stokes diameter Dst of the carbon black to within the range described above, it is possible to achieve both the productivity and cost efficiency of the carbon black.

That is, in a range in which $N_2SA$ is from 45 to 70 $m^2/g$, a specific carbon black in which the ratio $N_2SA/IA$ is from 1.00 to 1.40 and the Stokes Dst is at least 145 is used. Such a carbon black has a large Stokes diameter of aggregates and reduces the tan δ (60° C.) of the rubber composition while increasing the reinforcing performance with respect to the rubber, which makes it possible to improve the wear resistance of the rubber composition over the conventional level.

A carbon black having the colloidal properties described above can be produced by adjusting the production conditions such as the raw material oil introduction conditions of the carbon black production furnace, the supply volumes of the fuel oil and the raw material oil, the fuel oil combustion rate, and the reaction time (retention time of combustion gas from the final raw material oil introduction position until the reaction is stopped).

In the present technology, a reinforcing filler other than a specific carbon black having the colloidal properties described above can be added, and the balance of the tan 6 of the rubber composition and the mechanical characteristics such as the rubber hardness or strength can be adjusted. In particular, silica can be added as a reinforcing filler other than a specific carbon black having the colloidal properties described above. By adding silica together with a specific carbon black having the colloidal properties described above, it is possible to further reduce heat build-up in the rubber composition and to further reduce rolling resistance when a tire is produced. The compounding ratio of the silica is set to 0 to 50 parts by weight and preferably from 10 to 50 parts by weight per 100 parts by weight of the rubber component. By setting the compounding ratio of the silica to within such a range, it is possible to achieve both low heat build-up in the rubber composition and steering stability and ride comfort when a tire is produced. When the compounding ratio of the silica exceeds 50 parts by weight, the steering stability and ride comfort when a tire is produced are diminished.

The CTAB specific surface area of the silica is preferably from 70 to 250 $m^2/g$. When the CTAB of the silica is less than 70 $m^2/g$, the reinforcing property with respect to the rubber composition becomes insufficient, and the steering stability also becomes insufficient. In addition, when the CTAB of the silica exceeds 250 $m^2/g$, the rolling resistance increases. The CTAB specific surface area of the silica is determined in accordance with ISO 9277.

The silica used in the present technology may be a silica having the properties described above and may be selected appropriately from commercially available products or produced with an ordinary method so as to have the properties described above. Types of silicas that can be used include, for example, wet method silicas, dry method silicas, surface treated silicas, and the like.

When a silica is used in the rubber composition of the present technology, a silane coupling agent may be added together with the silica, which improves the dispersibility of the silica and makes it possible to further enhance the reinforcing property with the rubber component. When a silane coupling agent is added, the silane coupling agent is preferably added in an amount of from 3 to 20 wt. % and more preferably from 5 to 15 wt. % with respect to the compounded amount of the silica. If the compounding ratio of the silane coupling agent is less than 3 wt. % of the weight of the silica, the effect of improving the dispersibility of the silica cannot be sufficiently obtained. Additionally, if the compounding ratio of the silane coupling agent exceeds 20 wt. %, the silane coupling agents will condense, and the desired effects cannot be obtained.

The silane coupling agent is not particularly limited, but is preferably a sulfur-containing silane coupling agent. Examples thereof include bis-(3-triethoxysilylpropyl)tetrasulfide, bis-(3-triethoxysilylpropyl)disulfide, 3-trimethoxysilylpropyl benzothiazole tetrasulfide, γ-mercaptopropyltriethoxysilane, 3-octanoylthio propyltriethoxysilane, and the like.

The rubber composition for a tire can also contain various types of additives that are commonly used in rubber compositions for use in tires, such as vulcanization and crosslinking agents, vulcanization accelerators, various types of inorganic fillers, various types of oils, antiaging agents, and plasticizers. These additives may be kneaded according to any common method to form a rubber composition and may be used in vulcanization or crosslinking. The compounding ratio of these additives may be any conventional amount, as long as the object of the present technology is not impaired. The rubber composition for a tire according to the present technology can be produced by mixing each of the components described above using a commonly used rubber kneading machine such as a Banbury mixer, a kneader, and a roller.

The rubber composition for a run-flat tire according to the present technology can be suitably used for a side rubber reinforcement layer with a crescent-shaped cross section in a run-flat tire. A pneumatic tire in which the rubber composition of the present technology is used for a side rubber reinforcement layer has small heat build-up at the time of traveling, which makes it possible to reduce the rolling resistance and improve the fuel consumption performance. At the same time, improvements in the rubber hardness and the modulus of elasticity of the rubber composition make it possible to improve the steering stability and ride comfort when a tire is produced over the conventional level. In addition, the run-flat traveling performance is excellent at the time of run-flat traveling, and heat build-up in the side rubber reinforcement layer with a crescent-shaped cross section of the side wall portions is suppressed, so the durability performance is also excellent.

The present technology is further explained below by Working Examples. However, the scope of the present technology is not limited to these Working Examples.

EXAMPLES

Twenty-seven types of rubber compositions (Working Examples 1 to 15 and Comparative Examples 1 to 12) were prepared using nine types of carbon black (CB1 to CB9). Of these, 4 types of carbon black (CB1 to CB4) are commercial grade products, and 5 types of carbon black (CB5 to CB9) are trial products. The colloidal properties of each of the products are shown in Table 1.

TABLE 1

| | | Type of carbon black | | | | |
|---|---|---|---|---|---|---|
| | | CB1 | CB2 | CB3 | CB4 | CB5 |
| $N_2SA$ | $m^2/g$ | 77 | 68 | 59 | 41 | 55 |
| IA | mg/g | 72 | 68 | 65 | 44 | 47 |
| CTAB | $m^2/g$ | 81 | 73 | 69 | 43 | 57 |
| DBP | ml/100 g | 125 | 124 | 154 | 116 | 162 |
| 24M4 | ml/100 g | 105 | 102 | 100 | 83 | 114 |
| Dst | nm | 113 | 131 | 139 | 176 | 157 |
| ΔD50 | nm | 88 | 86 | 92 | 115 | 97 |
| α | — | 1600 | 1714 | 1665 | 1685 | 1807 |
| $N_2SA/IA$ | — | 1.06 | 1.00 | 0.90 | 0.92 | 1.18 |

| | | Type of carbon black | | | |
|---|---|---|---|---|---|
| | | CB6 | CB7 | CB8 | CB9 |
| $N_2SA$ | $m^2/g$ | 57 | 54 | 50 | 52 |
| IA | mg/g | 53 | 52 | 45 | 47 |
| CTAB | $m^2/g$ | 70 | 66 | 61 | 64 |
| DBP | ml/100 g | 133 | 138 | 123 | 120 |
| 24M4 | ml/100 g | 99 | 100 | 90 | 88 |
| Dst | nm | 146 | 150 | 155 | 179 |
| ΔD50 | nm | 99 | 101 | 116 | 138 |
| α | — | 1705 | 1700 | 1677 | 1993 |
| $N_2SA/IA$ | — | 1.07 | 1.03 | 1.09 | 1.11 |

In Table 1, each abbreviation represents each of the following colloidal properties.

$N_2SA$: nitrogen adsorption specific surface area measured based on JIS K6217-2

IA: iodine adsorption measured based on JIS K6217-1

CTAB: CTAB adsorption specific surface area measured based on JIS K6217-3

DBP: DBP absorption measured based on JIS K6217-4 (non-compressed sample)

24M4: 24M4-DBP absorption measured based on JIS K6217-4 (compressed sample)

Dst: mode diameter representing the maximum value of the mass distribution curve of the Stokes diameter of aggregates according to disc centrifuge photosedimentometry measured based on JIS K6217-6

Δ D50: width (half-width) of distribution when the mass frequency is half the height of the maximum point in the mass distribution curve of the Stokes diameter of aggregates according to disc centrifuge photosedimentometry measured based on JIS K6217-6

α: coefficient α when Dst and $N_2SA$ are applied to the relationship of the following formula (2):

$$Dst = \alpha \times (N_2SA)^{-0.61} \qquad (2)$$

(In the formula, Dst is the mode diameter (nm) in the mass distribution curve of the Stokes diameter of aggregates, and $N_2SA$ is the nitrogen adsorption specific surface area ($m^2/g$))

$N_2SA/IA$: ratio of the nitrogen adsorption specific surface area $N_2SA$ to the iodine adsorption IA In Table 1, the carbon black CB1 to CB4 represent the following commercial grades. In addition, the carbon black CB5 to CB9 were prepared by the following production methods.

CB1: SEAST KHP, manufactured by Tokai Carbon Co., Ltd.

CB2: SEAST NH, manufactured by Tokai Carbon Co., Ltd.

CB 3: SEAST 116HM, manufactured by Tokai Carbon Co., Ltd.

CB 4: SEAST F, manufactured by Tokai Carbon Co., Ltd.

Production of Carbon Black CB5 to CB9

The carbon black CB5 to CB9 were produced using a cylindrical reaction furnace while varying the total amount of air supplied, the amount of fuel oil introduced, the fuel oil combustion rate, the amount of raw material oil introduced, and the reaction time as shown in Table 2.

TABLE 2

| Production conditions | | CB5 | CB6 | CB7 | CB8 | CB9 |
|---|---|---|---|---|---|---|
| Total amount of air supplied | Nm$^3$/H | 1000 | 1050 | 980 | 950 | 980 |
| Amount of fuel oil introduced | Nm$^3$/H | 77 | 63 | 65 | 58 | 59 |
| Fuel oil combustion rate | % | 180 | 185 | 160 | 220 | 200 |
| Amount of raw material oil introduced | Nm$^3$/H | 280 | 310 | 320 | 320 | 300 |
| Reaction time | ms | 235 | 210 | 205 | 190 | 195 |

Preparation and Evaluation of Rubber Compositions for Tires

When preparing the 27 types of rubber compositions (Working Examples 1 to 15 and Comparative Examples 1 to 12) consisting of the compositions shown in Tables 3 to 5 using the nine types of carbon black (CB1 to CB9) described above, all of the components except sulfur and a vulcanization accelerator were weighed and kneaded for 15 minutes with a 55 L kneader, and this master batch was then discharged and cooled to room temperature. The master batch was fed to a 55 L kneader, and the sulfur and the vulcanization accelerator were then added to the master batch and mixed to obtain a rubber composition for a tire.

Side rubber reinforcement layers with a crescent-shaped cross section illustrated in FIG. 1 were configured using the resulting 27 types of rubber compositions, and run-flat tires with a tire size of 195/65R15 were vulcanized and molded. The rolling resistance, steering stability, and ride comfort of the resulting 27 types of pneumatic tires were evaluated in accordance with the methods described below.

Rolling Resistance

The obtained tire was assembled on a standard rim (wheel size: 15×6 J), which was attached to an indoor drum testing machine in compliance with JIS D4230 (drum diameter: 1707 mm). A high-speed durability test was performed in accordance with the high-speed durability test described in "6.4 High-speed performance test A" of JIS D4230, and the resistance at a test load of 2.94 kN and a speed of 50 km/h was measured and used as the rolling resistance. The obtained results are shown in the "Rolling resistance" rows of Tables 3 to 5 as an index with the inverse of the value of Comparative Example 1 taken as 100. Larger indices indicate smaller rolling resistance and superior fuel consumption performance.

Steering Stability

The obtained pneumatic tires were assembled on standard rims (wheel size: 15×6 J) and mounted on a 2.0 L class test vehicle (made in Japan). The pneumatic tires were inflated to an air pressure of 230 kPa and the test vehicle was driven on a 2.6 km test course consisting of a dry road. The steering stability performance at this time was scored based on a sensory evaluation performed by three experienced evaluators. The obtained results are shown in the "Steering stability" rows of Tables 3 to 5 as an index with the value of Comparative Example 1 taken as 100. Larger indices indicate superior steering stability.

Ride Comfort

The obtained pneumatic tires were assembled on standard rims (wheel size: 15×6 J) and mounted on a 2.0 L class test vehicle (made in Japan). The pneumatic tires were inflated to an air pressure of 230 kPa and the test vehicle was driven on a 2.6 km test course consisting of a dry road. The ride comfort performance at this time was scored based on a sensory evaluation performed by three experienced evaluators. The obtained results are shown in the "Ride comfort" rows of Tables 3 to 5 as an index with the value of Comparative Example 1 taken as 100. Larger indices indicate superior ride comfort.

TABLE 3

| | | Comparative Example 1 | Comparative Example 2 | Comparative Example 3 | Comparative Example 4 |
|---|---|---|---|---|---|
| NR | pbw | 30 | 30 | 30 | 30 |
| SBR | pbw | | | | |
| BR | pbw | 40 | 40 | 40 | 40 |
| VCR | pbw | 30 | 30 | 30 | 30 |
| Type of carbon black and compounding ratio | pbw | CB1 60 | CB2 60 | CB3 60 | CB4 60 |
| Silica | pbw | | | | |
| Silane coupling agent | pbw | | | | |
| Aromatic oil | pbw | 5 | 5 | 5 | 5 |
| Zinc oxide | pbw | 3 | 3 | 3 | 3 |
| Stearic acid | pbw | 2 | 2 | 2 | 2 |
| Vulcanization accelerator | pbw | 2.5 | 2.5 | 2.5 | 2.5 |
| Sulfur | pbw | 5 | 5 | 5 | 5 |
| Rolling resistance | Index value | 100 | 102 | 94 | 118 |
| Steering stability | Index value | 100 | 95 | 102 | 75 |
| Ride comfort | Index value | 100 | 105 | 95 | 110 |

| | | Working Example 1 | Working Example 2 | Working Example 3 | Working Example 4 | Working Example 5 |
|---|---|---|---|---|---|---|
| NR | pbw | 30 | 30 | 30 | 30 | 30 |
| SBR | pbw | | | | | |

TABLE 3-continued

| | | | | | | |
|---|---|---|---|---|---|---|
| BR | pbw | 40 | 40 | 40 | 40 | 40 |
| VCR | pbw | 30 | 30 | 30 | 30 | 30 |
| Type of carbon black and compounding ratio | pbw | CB5 60 | CB6 60 | CB7 60 | CB8 60 | CB9 60 |
| Silica | pbw | | | | | |
| Silane coupling agent | pbw | | | | | |
| Aromatic oil | pbw | 5 | 5 | 5 | 5 | 5 |
| Zinc oxide | pbw | 3 | 3 | 3 | 3 | 3 |
| Stearic acid | pbw | 2 | 2 | 2 | 2 | 2 |
| Vulcanization accelerator | pbw | 2.5 | 2.5 | 2.5 | 2.5 | 2.5 |
| Sulfur | pbw | 5 | 5 | 5 | 5 | 5 |
| Rolling resistance | Index value | 105 | 107 | 109 | 111 | 109 |
| Steering stability | Index value | 110 | 110 | 105 | 105 | 107 |
| Ride comfort | Index value | 105 | 105 | 105 | 105 | 107 |

TABLE 4

| | | Comparative Example 5 | Comparative Example 6 | Working Example 6 | Working Example 7 | Comparative Example 7 | Comparative Example 8 |
|---|---|---|---|---|---|---|---|
| NR | pbw | 30 | 30 | 30 | 20 | 10 | |
| SBR | pbw | 70 | 65 | 60 | | | 30 |
| BR | pbw | | 3 | 5 | 50 | 50 | 40 |
| VCR | pbw | | 2 | 5 | 30 | 40 | 30 |
| Type of carbon black and compounding ratio | pbw | CB5 60 | CB5 60 | CB5 60 | CB5 60 | CB5 60 | CB5 60 |
| Silica | pbw | | | | | | |
| Silane coupling agent | pbw | | | | | | |
| Aromatic oil | pbw | 5 | 5 | 5 | 5 | 5 | 5 |
| Zinc oxide | pbw | 3 | 3 | 3 | 3 | 3 | 3 |
| Stearic acid | pbw | 2 | 2 | 2 | 2 | 2 | 2 |
| Vulcanization accelerator | pbw | 2.5 | 2.5 | 2.5 | 2.5 | 2.5 | 2.5 |
| Sulfur | pbw | 5 | 5 | 5 | 5 | 5 | 5 |
| Rolling resistance | Index value | 90 | 95 | 101 | 108 | 108 | 98 |
| Steering stability | Index value | 91 | 100 | 105 | 102 | 95 | 112 |
| Ride comfort | Index value | 105 | 100 | 110 | 105 | 105 | 100 |

| | | Comparative Example 9 | Working Example 8 | Working Example 9 | Comparative Example 10 | Comparative Example 11 |
|---|---|---|---|---|---|---|
| NR | pbw | 5 | 10 | 40 | 50 | |
| SBR | pbw | 25 | 20 | | | 100 |
| BR | pbw | 40 | 40 | 40 | 30 | |
| VCR | pbw | 30 | 30 | 20 | 20 | |
| Type of carbon black and compounding ratio | pbw | CB5 60 | CB5 60 | CB5 60 | CB5 60 | CB5 60 |
| Silica | pbw | | | | | |
| Silane coupling agent | pbw | | | | | |
| Aromatic oil | pbw | 5 | 5 | 5 | 5 | 5 |
| Zinc oxide | pbw | 3 | 3 | 3 | 3 | 3 |
| Stearic acid | pbw | 2 | 2 | 2 | 2 | 2 |
| Vulcanization accelerator | pbw | 2.5 | 2.5 | 2.5 | 2.5 | 2.5 |
| Sulfur | pbw | 5 | 5 | 5 | 5 | 5 |
| Rolling resistance | Index value | 98 | 101 | 110 | 110 | 85 |

TABLE 4-continued

| Steering stability | Index value | 112 | 112 | 103 | 99 | 105 |
| Ride comfort | Index value | 100 | 105 | 110 | 110 | 95 |

TABLE 5

| | | Comparative Example 12 | Working Example 10 | Working Example 11 |
|---|---|---|---|---|
| NR | pbw | 30 | 30 | 30 |
| SBR | pbw | | | |
| BR | pbw | 40 | 40 | 40 |
| VCR | pbw | 30 | 30 | 30 |
| Type of carbon black and compounding ratio | pbw | CB6 20 | CB6 30 | CB6 40 |
| Silica | pbw | 40 | 30 | 20 |
| Silane coupling agent | pbw | 3.2 | 2.4 | 1.6 |
| Aromatic oil | pbw | 5 | 5 | 5 |
| Zinc oxide | pbw | 3 | 3 | 3 |
| Stearic acid | pbw | 2 | 2 | 2 |
| Vulcanization accelerator | pbw | 2.5 | 2.5 | 2.5 |
| Sulfur | pbw | 5 | 5 | 5 |
| Rolling resistance | Index value | 125 | 120 | 115 |
| Steering stability | Index value | 99 | 103 | 110 |
| Ride comfort | Index value | 115 | 113 | 110 |

| | | Working Example 12 | Working Example 13 | Working Example 14 | Working Example 15 |
|---|---|---|---|---|---|
| NR | pbw | 30 | 30 | 30 | 30 |
| SBR | pbw | | | | |
| BR | pbw | 40 | 70 | 60 | 30 |
| VCR | pbw | 30 | | 10 | 40 |
| Type of carbon black and compounding ratio | pbw | CB6 60 | CB6 60 | CB6 60 | CB6 60 |
| Silica | pbw | 25 | | | |
| Silane coupling agent | pbw | 2.0 | | | |
| Aromatic oil | pbw | 5 | 5 | 5 | 5 |
| Zinc oxide | pbw | 3 | 3 | 3 | 3 |
| Stearic acid | pbw | 2 | 2 | 2 | 2 |
| Vulcanization accelerator | pbw | 2.5 | 2.5 | 2.5 | 2.5 |
| Sulfur | pbw | 5 | 5 | 5 | 5 |
| Rolling resistance | Index value | 101 | 130 | 120 | 110 |
| Steering stability | Index value | 120 | 101 | 103 | 115 |
| Ride comfort | Index value | 105 | 120 | 110 | 102 |

The types of raw materials used in Tables 3 to 5 are shown below.

NR: Natural rubber, RSS #3

BR: Butadiene rubber; Nipol BR1220, manufactured by Zeon Corporation

SBR: Styrene-butadiene rubber; Nipol 1502, manufactured by Zeon Corporation

VCR: Butadiene rubber containing 12 wt. % of a syndiotactic-1,2-polybutadiene component; UBEPOL VCR412, manufactured by Ube Industries, Ltd.

CB1 to CB9: Carbon black shown in Table 1

Silica: VN-3, manufactured by Evonic Degussa Corporation

Silane coupling agent: 3-triethoxysilyl propyl tetrasulfide; CABRUS 4, manufactured by Daiso Co. Ltd.

Aroma oil: Process X-140, manufactured by Japan Energy Corporation

Zinc oxide: Zinc Oxide III, manufactured by Seido Chemical Industry Co., Ltd.

Stearic acid: beads stearic acid, manufactured by NOF Corporation

Vulcanization accelerator: Nocceler CZ-G, manufactured by Ouchi Shinko Chemical Industrial Co., Ltd.

Sulfur: Crystex HSOT20, manufactured by Akzo Nobel

As is clear from Tables 3 to 5, it was confirmed that the rubber compositions for tires according to Working Examples 1 to 15 enhance the low rolling resistance, steering stability, and ride comfort over the conventional level.

As is clear from Table 3, the rubber composition of Comparative Example 1 has $N_2SA$ of the carbon black CB1 exceeding 70 $m^2/g$ and a Stokes diameter Dst of less than 145 nm, so the balance of low rolling resistance and wear resistance is inferior to that of the rubber compositions for tires according to Working Examples 1 to 5. The Stokes diameter Dst of the carbon black CB2 of the rubber composition of Comparative Example 2 is less than 145 nm, so the steering stability is diminished. The Stokes diameter Dst of the carbon black CB3 of the rubber composition of Comparative Example 3 is less than 145 nm, and the ratio $N_2SA/IA$ is less than 1.00, so the low rolling resistance and ride comfort are diminished. The rubber composition of Comparative Example 4 has $N_2SA$ of the carbon black CB4 of less than 45 $m^2/g$ and a ratio $N_2SA/IA$ of less than 1.00, so the steering stability is diminished.

As is clear from Table 4, the rubber composition of Comparative Example 5 does not contain a butadiene rubber (BR and VCR), so the rolling resistance and steering stability are diminished. The compounding ratio of the butadiene rubber (BR and VCR) of the rubber composition of Comparative Example 6 is less than 10 parts by weight, so the rolling resistance is diminished. The compounding ratio of the butadiene rubber (BR and VCR) of the rubber composition of Comparative Example 7 exceeds 80 parts by weight, so the steering stability is diminished. The rubber composition of Comparative Example 8 does not contain a natural rubber (NR), so the rolling resistance is diminished. The compounding ratio of the natural rubber (NR) of the rubber composition of Comparative Example 9 is less than 10 parts by weight so the rolling resistance is diminished. The compounding ratio of the natural rubber (NR) of the rubber composition of Comparative Example 10 exceeds 40 parts by weight, so the steering stability is diminished. The rubber composition of Comparative Example 11 does not contain a natural rubber (NR) or a butadiene rubber (BR and VCR), so the rolling resistance and ride comfort are diminished.

The ratio of carbon black to the reinforcing filler of the rubber composition of Comparative Example 12 is less than 50%, so the steering stability performance is diminished.

What is claimed is:

1. A rubber composition for a run-flat tire, the rubber composition comprising:

from 20 to 100 parts by weight of a reinforcing filler per 100 parts by weight of a diene rubber containing from 10 to 80 wt. % of butadiene rubber and from 10 to 40 wt. % of natural rubber; wherein the reinforcing filler contains at least 50 wt. % of carbon black;

a mode diameter Dst in a mass distribution curve of a Stokes diameter of aggregates of the carbon black is at least 145 nm;

a nitrogen adsorption specific surface area $N_2SA$ is from 55 to 70 m$^2$/g;

a ratio $N_2SA$/IA of the nitrogen adsorption specific surface area $N_2SA$ to an iodine adsorption IA (units: mg/g) is from 1.00 to 1.40; and the mode diameter $D_{st}$ of the Stokes diameter satisfies a relationship of the following formula (1):

$$D_{st} < 1979 \times (N_2SA)^{-0.61} \quad (1)$$

wherein, $D_{st}$ is the mode diameter (nm) in the mass distribution curve of the Stokes diameter of aggregates, and $N_2SA$ is the nitrogen adsorption specific surface area (m$^2$/g).

2. The rubber composition for a run-flat tire according to claim 1, wherein a DBP absorption of the carbon black is from 100 to 160 ml/100 g.

3. The rubber composition for a run-flat tire according to claim 1, wherein from 10 to 40 wt. % of a butadiene rubber containing a syndiotactic-1,2-polybutadiene component is contained in the diene rubber as the butadiene rubber.

4. A pneumatic tire comprising rubber reinforcement layers having a crescent-shaped cross section of left and right side wall portions of a run-flat tire formed with the rubber composition for a run-flat tire described in claim 1.

5. The rubber composition for a run-flat tire according to claim 2, wherein from 10 to 40 wt. % of a butadiene rubber containing a syndiotactic-1,2-polybutadiene component is contained in the diene rubber as the butadiene rubber.

6. A pneumatic tire comprising rubber reinforcement layers having a crescent-shaped cross section of left and right side wall portions of a run-flat tire formed with the rubber composition for a run-flat tire described in claim 2.

7. A pneumatic tire comprising rubber reinforcement layers having a crescent-shaped cross section of left and right side wall portions of a run-flat tire formed with the rubber composition for a run-flat tire described in claim 3.

* * * * *